United States Patent
Woytaszek

[11] Patent Number: 5,935,038
[45] Date of Patent: Aug. 10, 1999

[54] ROTARY GEAR DRIVE SYSTEM HAVING BEVEL INPUT GEARS

[76] Inventor: Lloyd Woytaszek, 9549 Fitzpatrick, Alpena, Mich. 49707

[21] Appl. No.: 08/995,814

[22] Filed: Dec. 22, 1997

[51] Int. Cl.$^6$ ....................................................... F16H 1/46
[52] U.S. Cl. .......................... 475/336; 475/339; 475/338
[58] Field of Search .................................... 475/331, 336, 475/337, 338, 339; 74/416, 417

[56] References Cited

U.S. PATENT DOCUMENTS

| | | |
|---|---|---|
| 328,014 | 10/1885 | Cushman . |
| 1,366,325 | 1/1921 | Perin . |
| 1,815,334 | 7/1931 | Sheridan . |
| 2,033,343 | 3/1936 | Larkin, Jr. . |
| 2,090,810 | 8/1937 | Russell et al. .......................... 475/336 |
| 2,122,330 | 6/1938 | Stenzy . |
| 2,179,405 | 11/1939 | De Falco . |
| 2,795,971 | 6/1957 | Annis . |
| 2,989,596 | 6/1961 | Lee et al. . |
| 3,156,136 | 11/1964 | Sogabe . |
| 3,330,171 | 7/1967 | Nasvytis . |
| 3,543,690 | 12/1970 | Lee . |
| 4,044,633 | 8/1977 | Lee . |
| 4,321,842 | 3/1982 | Stromotich . |
| 4,641,552 | 2/1987 | Kurywczak .......................... 475/339 X |
| 5,456,640 | 10/1995 | Petersen .............................. 475/336 X |
| 5,554,082 | 9/1996 | Umeyama et al. ..................... 475/338 |
| 5,759,130 | 6/1998 | Woytaszek .............................. 475/339 |

FOREIGN PATENT DOCUMENTS

| | | |
|---|---|---|
| 59-190545 | 10/1984 | Japan ..................................... 475/336 |

*Primary Examiner*—Khoi Q. Ta
*Attorney, Agent, or Firm*—Reising, Ethington, Barnes, Kisselle, Learman & McCulloch, P.C.

[57] ABSTRACT

A gear-reducing, torque-multiplying gear drive assembly includes input and output shafts journaled by a case for rotation about a common first axis. A rotary cage is accommodated within the case and is fixed to the output shaft. A bevel drive gear is fixed on the input shaft. Input and output bevel gear sets are mounted on planet shafts carried by the cage in spaced, parallel relation to the input bevel gear. A set of transversely arranged idler bevel gears couple the drive gear to the input planet gears. The output planet gears are enmeshed with a stationary sun gear. Rotating the input shaft rotates the planet gears through the transverse idler bevel gears, which in turn rotates the cage and output shaft.

9 Claims, 2 Drawing Sheets

ROTARY GEAR DRIVE SYSTEM HAVING BEVEL INPUT GEARS

This invention relates to rotary gear drive systems and particularly those that generate a reduced gear ratio with a corresponding increased torque ratio between the driving and driven members of the system.

BACKGROUND OF THE INVENTION

Various gearing arrangements have been proposed which increase the output torque of the driven component of a system in relation to the input torque by control of the input-to-output gear ratio.

U.S. Pat. Nos. 2,122,330; 3,156,136; and 4,321,842 disclose rotary gear drive systems in which an internal rotary frame or cage is arranged within a case and carries one or more input and output planet gear sets. The output planet gears are meshed with a stationary sun gear. The input planet gears are spaced from a common central drive gear on the input shaft and are coupled for driven rotation by endless chains or intermediate spur gears. It is believed that for such systems employing the chainless idler spur gear drive connection between the driven gear and planet gears (both which are likewise spur gears), that an amount of torque that could otherwise be transmitted to the output shaft is lost on account of the idler gears acting, in effect, like sun gears during operation. It has been observed that the idler gears are caused to orbit about the drive gear with the cage but that they do not themselves rotate relative to the fixed case. It is believed that such lack of rotation of the spur-type idler gears accounts for the reduced torque transfer.

It is an object of the present invention to provide a chainless gear drive system that overcomes the above disadvantages.

SUMMARY OF THE INVENTION AND ADVANTAGES

A gear-reducing, torque-increasing rotary gear drive assembly constructed according to the present invention comprises a case journaling an input shaft and housing a rotary carrier. The carrier is journaled on the input shaft and has at least one planet shaft journaled by the carrier in parallel, laterally spaced relation to the input shaft. A set of input and output planet gears are fixed on the planet shaft. An input drive gear is fixed on the input shaft and is coupled to the input planet gear by a driving connection to effect rotation of the input planet gears in response to rotation of the drive gear. A stationary sun gear is disposed about the input shaft in meshing engagement with the output planet gear so as to cause the carrier to rotate in response to rotation of the output planet gear. A rotary output member is fixed to and rotates with the carrier about an axis of the output member. The assembly is characterized by the input drive gear and the input planet gear being in the form of bevel gears and the drive connection comprising at least one input idler shaft journaled by the carrier in transversely extending relation between the input shaft and input planet shaft and carrying at its ends a pair of idler bevel gears enmeshed with the input drive gear and input planet gear, respectively.

It is believed that the bevel gear arrangement of the invention overcomes the sun gear effect believed to be attributed to the spur gear drive connection of the prior art above.

THE DRAWINGS

These and other features and advantages of the present invention will become more fully appreciated by those skilled in the art when considered in connection with the following detail description and accompanying drawings, wherein:

FIG. 1 is a cross-sectional front elevation view of a drive gear assembly constructed according to one embodiment of the invention, and FIG. 2 is a view like FIG. 1, but of an alternative embodiment of the invention.

DETAILED DESCRIPTION

Figure 1:
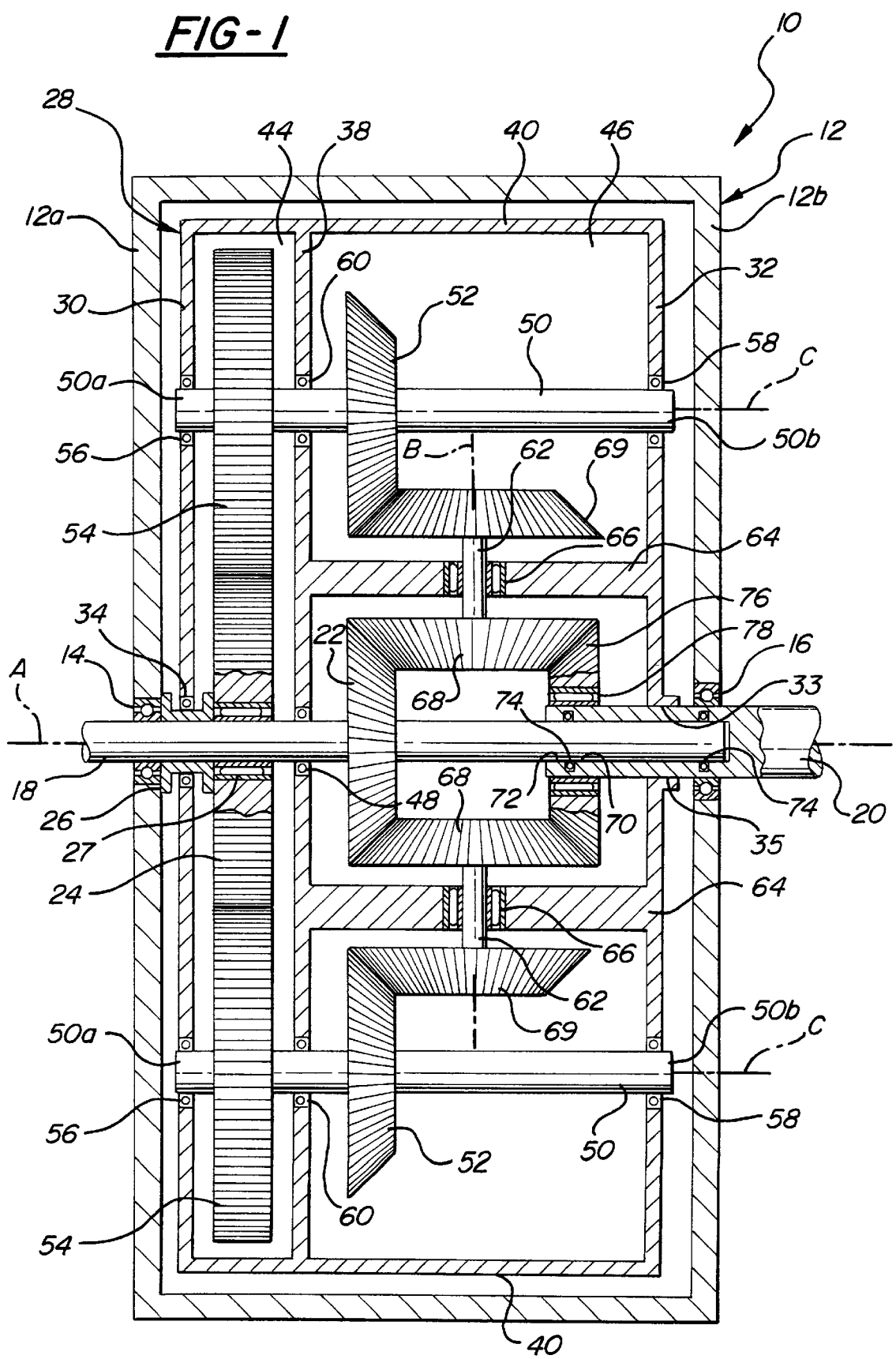

A gear-reducing, torque-multiplying gear drive assembly constructed in accordance with one embodiment of the invention is indicated generally at 10 in FIG. 1 and comprises a stationary enclosure or case 12 having opposed end walls 12a, 12b in which suitable journal bearings 14, 16 are provided supporting input and output members or shafts 18, 20, respectively for rotation about a common longitudinal axis A relative to the case 12.

The input shaft 18 mounts an input drive gear 22 fixed on the shaft 18 by means of a key, spline, weldment, or other suitable connections for driving rotation with the shaft 18 about the axis A. Adjacent the drive gear 22 is a fixed sun gear 24 disposed co-axially about the input shaft 18 and fixed against rotation to the end wall 12a of the case 12 by bushing 26. The input shaft 18 passes through a central bore of the bushing 26 and is rotatable relative thereto. A bearing 27 supports the input shaft 18 for rotation relative to the fixed sun gear 24.

Supported also within the case 12 is a rotary carrier or cage 28. The cage 28 has a pair of parallel, laterally spaced end walls 30, 32 preferably in the form of rectangular or cylindrical plates journaled by bearing 34 about the busing 26 to enable the cage 12 to rotate within the case 12 about the axis A. The cage 12 preferably includes a third intermediate wall 38 arranged in parallel, spaced relation to the two end walls 30, 32, dividing the cage 12 into left 44 and right 46 chambers. The walls 30, 32 and 38 are connected to one another to provide a rigid frame structure by cross braces 40 provided at circumferentially spaced locations adjacent the perimeter of the walls. It is preferred that the intermediate wall 38 be fitted with a journal bearing 48 for journaled support on the input shaft 18. As illustrated best in FIG. 1, the fixed sun gear 24 is accommodated within the left chamber 44 and the input drive gear is accommodated within the right chamber 46.

At least one and preferably two planet shafts 50 are journaled at their ends by the end walls 30, 32 of the cage 28 in parallel, radially outwardly spaced relation to the input shaft 18. Each planet shaft 50 has fixed thereto a set of input and output planet gears 52, 54 that are rotatable with the shafts 50 relative to the cage 28. As shown in FIG. 1, the opposite ends 50a, 50b of the planet shafts 50 are supported by suitable journal bearings 56, 58 provided in the end walls 30, 32 to provide support to the shafts 50 axially outwardly of the planet gears 52, 54. It is preferred also that the intermediate wall 38 have a similar journal bearing 60 to support the shafts 50 between the planet gears 52, 54.

As also shown in FIG. 1, the input planet gears 52 comprise bevel gears having toothed working surfaces inclined at a predetermined angle, and preferably 450, to the axis of the respective planet shafts 50. It will be seen also that the input drive gear 22 is likewise a bevel gear. The input planet gears 52 are spaced from the input drive gear 22 such that their teeth do not directly intermesh, but instead are coupled by a driving connection to be described below. The output planet gears 54 and the fixed sun gear 24 preferably comprise spur gears having intermeshing teeth.

The drive connection between the input gear 22 and the input planet gears 52 comprises at least one and in the illustrated embodiment a pair of idler shafts 62 extending transversely and preferably perpendicular to the input shaft 18 and the planet shafts 50, such that the axis B of each idler shaft 62 intersects the axis A of the input shaft and the axes C of the corresponding planet shafts 50. The idler shafts 62 are supported in such position by transverse cross plates 64 of the cage 28 extending between the end wall 32 and intermediate wall 38 of the right chamber 46. The plates 64 mount suitable bearings 66 that journal the shafts 62 for rotation about their axes B relative to the cage 28.

A first set of idler bevel gears 68 is fixed to the radially inward ends of the idler shafts 62. The gears 68 are selected to compliment the bevel input gear 22 such that their teeth are enmeshed and their working faces are inclined to the axis of the input and idler shafts 18, 62.

Another set of idler bevel gears 69 is provided on the radially outward ends of the idler shafts 62. The teeth of the gears are enmeshed with the teeth of the input bevel planet gears 52.

The output shaft 20 preferably has a hollow inner end or bore 70 accommodating the opposite end 72 of the input shaft 18. The shaft 20 is secured by suitable fasteners or the like to the cage 28 for coaxial rotation with the cage 28 about the axis A of the input shaft 18. As shown in FIG. 1, the end wall 32 of the cage 28 may be provided with a hub 33 having a set screw 35 for fixing the cage 28 on the output shaft 20. Of course, other means, such as a spline connection, weldment, etc. could be used to secure the shaft 20 for conjoint rotation with the cage 28. A suitable bearing 74 is provided within the bore 70 of the output shaft to journal the end 72 of the input shaft 18.

An additional bevel idler support gear 76 is journaled on the output shaft 20 by bearing 78 in opposite facing relation to the input gear 22. The support gear 76 has teeth that are enmeshed with the teeth of the inward idler gears 68 so as to provide support to such gears 68 on the side opposite the input gear 22.

In operation, rotation of the input shaft and drive gear 22 in a clockwise direction about the axis A causes the idler gears 68, 69 to rotate clockwise about their perpendicular axis, and in turn causes the planet gears 52, 54 to rotate clockwise about their axes. Such rotation of the output planet gears 54 causes the cage 28 to rotate counterclockwise about the axis A in the same direction as the input shaft through the interaction of the output planet gears with the fixed sun gear 22. The output shaft 20, being fixed to the cage 28, rotates with the cage about the axis A in the counterclockwise direction, opposite that of the input shaft 18.

The above-described gear arrangement generates a two-to-one gear ratio while believed to generate a one-to-four torque ratio. This occurs when the drive gear 22, idler gears 68, 69, and the input planet gears are selected to be of the same size, and the output planet gears 54 and fixed sun gear 22 are selected to replace the size as the input gears.

Figure 2:
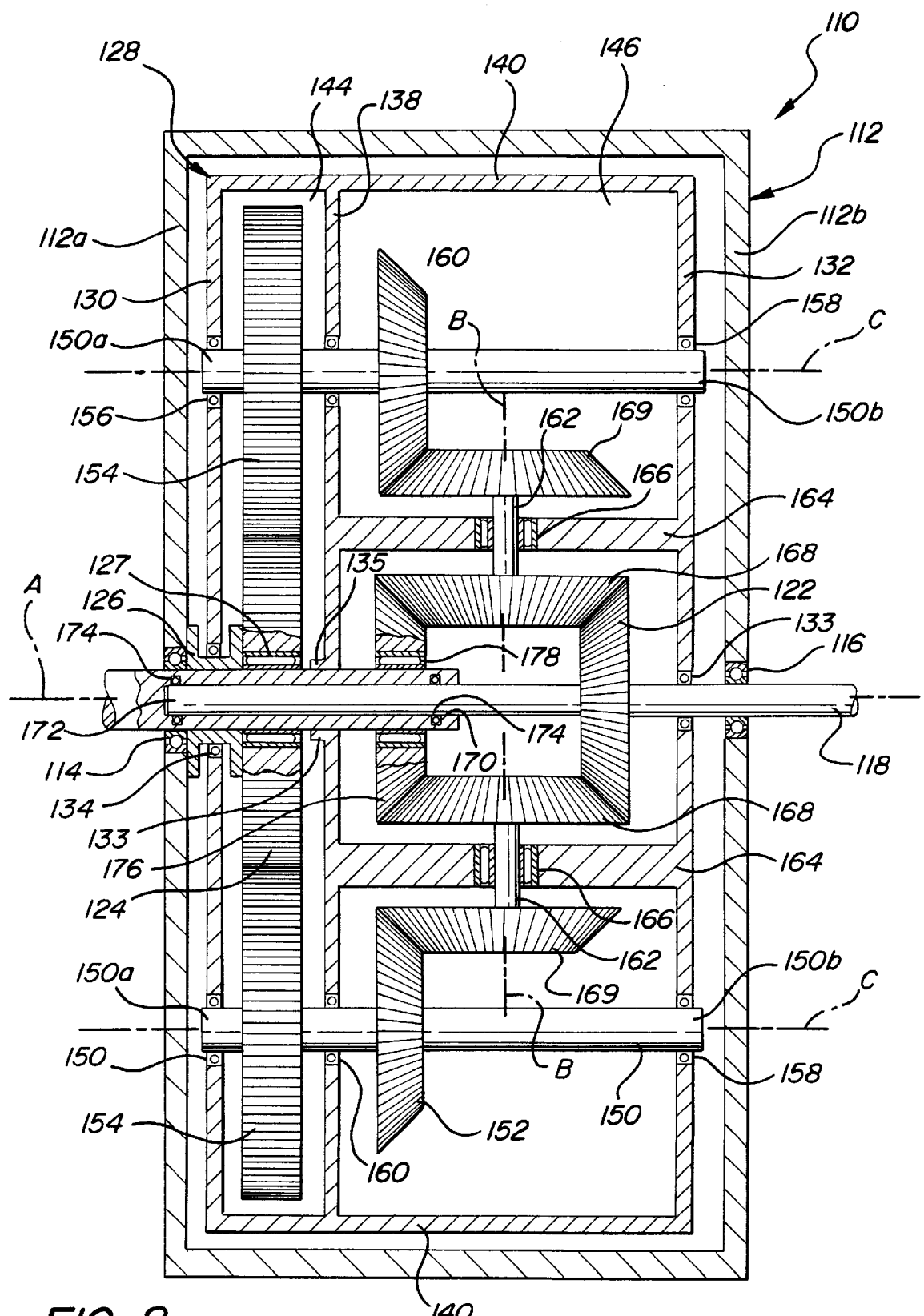

FIG. 2 shows an alternative embodiment of the invention. The same reference numerals used in the FIG. 1 are used in FIG. 2 to indicate like parts, but they have been offset by 100.

The gear drive assembly 110 of FIG. 2 is generally the same as that of the embodiment of FIG. 1, except that certain of the gearing components are rearranged to drive the output shaft 120 in the same direction as the input shaft 118. As shown in FIG. 2, the input shaft 118 extends into the case 112 from the opposite side and is journaled by bearing 116 of the case. Input drive gear 122 is fixed to the input shaft 118 as before, but is located adjacent the end wall 132 of the cage 128 rather than the intermediate wall 138. The idler support gear 176 is now adjacent the intermediate wall 138.

The output shaft 120 extends into the case 112 through end wall 112a and is journaled by bearing 114 of the case and by the bushing 126. The sun gear 124 is fixed in the same manner to the wall 112a of the case by the bushing 126 and has a bearing 127 that supports the output shaft 120 for rotation relative to the fixed sun gear 124. The output shaft 120 extends through the intermediate wall 138 of the cage 128 and mounts the bearing 178 adjacent its free end on which the idler bevel gear 176 is support for journaled rotation relative to the output shaft 120.

The output shaft 120 is likewise fixed to the cage 128 by any suitable means for rotation therewith. As shown in FIG. 2, the output shaft 120 is secured to the intermediate wall 138 of the cage 128 by means of a hub 133 and set screw 135 in the same manner as the FIG. 1 embodiment. As mentioned with regard to the FIG. 1 embodiment, other means could be used to fix the output shaft 120 to the cage 128 for conjoint rotation.

The operation of the FIG. 2 embodiment is much the same. Clockwise rotation of the input shaft 118 drives the input gear 122 and hence the idler bevel gears 168 and 169 in a clockwise direction about axis A, and drives the idler planet gears 168, 169 in a counterclockwise direction, which in turn drives the output planet gears 154 clockwise when viewed along their axes C from the left of FIG. 2. This in turn rotates the cage 128 and thus the output shaft 120 in a clockwise direction, the same as that of the input shaft 118.

The disclosed embodiments are representative of presently preferred forms of the invention, but are intended to be illustrative rather than definitive thereof. The invention is defined in the claims.

I claim:

1. A rotary gear drive assembly comprising:

a case;

a driving input shaft journaled by said case for rotation about a longitudinal axis of said input shaft;

a rotary carrier located within said case;

an input drive gear fixed on said input shaft;

at least one planet shaft journaled by said carrier in parallel, laterally spaced relation to said input shaft;

at least one input planet gear fixed on said planet shaft;

a driving connection coupling said input drive gear and said at least one input planet gear to effect rotation of said input planet gear in response to rotation of said input drive gear;

at least one output planet gear fixed on said planet shaft;

a stationary sun gear disposed about said input shaft in meshing engagement with said output planet gear to effect rotation of said carrier in response to rotation of said output planet gear;

a rotary output member fixed to said carrier for rotation therewith about an axis of said output member; and wherein said input drive gear and said at least one input planet gear comprise bevel gears and said driving connection comprises at least one idler shaft journaled by said carrier in transversely extending relation between said input shaft and said input planet shaft and a pair of idler bevel gears fixed on opposite ends of said idler shaft and enmeshed with said input drive gear and said input planet gear, respectively.

2. The assembly of claim 1 wherein said at least one idler shaft is supported perpendicular to said input shaft.

3. The assembly of claim 1 wherein there are at least two of said input planet shafts and at least two of said input planet gears.

4. The assembly of claim 3 wherein there are two of said idler shafts each mounting a pair of said input idler gears enmeshed with said input drive gear and said input planet gears, respectively.

5. The assembly of claim 4 including a bevel idler support gear arranged opposite said input drive gear and enmeshed with said pair of input idler gears associated with said input drive gear.

6. The assembly of claim 5 wherein said output member comprises an output shaft journaled by said case in coaxial alignment with said input shaft.

7. The assembly of claim 6 wherein said input shaft is journaled by said output shaft.

8. The assembly of claim 7 wherein said bevel idler gear is journaled on said output shaft.

9. A rotary gear drive assembly comprising:

a case;

a driving input shaft journaled at one end thereof by said case for rotation about a longitudinal axis of said input shaft;

a rotary cage located within said case having a pair of opposed axially spaced end walls journaled about said input shaft;

a input drive gear fixed on said input shaft between said end walls of said cage;

a pair of planet shafts journaled by said end walls of said cage in parallel, laterally spaced relation to said input shaft;

an input planet gear fixed on each of said planet shafts between said end walls and spaced from said input gear;

a pair of opposed input idler shafts journaled by said cage between said input shaft and said planet shafts aligned along a rotation axis transverse to said longitudinal axis of said input shaft;

a pair of input idler gears fixed on opposite ends of each of said idler shafts and enmeshed with said input gear and said input planet gears, respectively;

a pair of output planet gears fixed on said planet shafts between said end walls axially adjacent said input planet gears;

a stationary sun gear disposed about said input shaft between said end walls in meshing engagement with said output planet gears to effect rotation of said cage in response to rotation of said output planet gears;

an output shaft fixed to said cage in coaxial relation to said input shaft for rotation with said cage about the axis of said output shaft;

an idler support gear journaled on said output shaft opposite said input gear and enmeshed with said input idler gears associated with said input gear;

and wherein said input gear, said input idler gears, said input planet gears, and said idler support gear comprise bevel gears, and wherein said sun gear and said output planet gears comprise spur gears.

* * * * *

UNITED STATES PATENT AND TRADEMARK OFFICE
CERTIFICATE OF CORRECTION

PATENT NO. : 5,935,038
DATED : August 10, 1999
INVENTOR(S) : Lloyd Woytaszek

It is certified that error appears in the above-indentified patent and that said Letters Patent is hereby corrected as shown below:

Column 2, line 60, should read -- 45°-- instead of "450".

Signed and Sealed this

Twenty-ninth Day of February, 2000

Attest:

Q. TODD DICKINSON

Attesting Officer

Commissioner of Patents and Trademarks